United States Patent [19]

Soeding

[11] 4,126,726
[45] Nov. 21, 1978

[54] DISC-SHAPED INFORMATION CARRIER HAVING INFORMATION IN THE FORM OF A BEAM-REFLECTING STRUCTURE AND A PROCESS FOR PRODUCING THE SAME

[75] Inventor: Horst Soeding, Hanover, Germany

[73] Assignee: Polygram GmbH, Hamburg, Germany

[21] Appl. No.: 784,522

[22] Filed: Apr. 4, 1977

[30] Foreign Application Priority Data

Apr. 9, 1976 [DE] Fed. Rep. of Germany ....... 2615605

[51] Int. Cl.² .......................... G11B 7/00; G11B 5/82; B32B 15/08; B32B 15/20

[52] U.S. Cl. .................................. 428/163; 156/209; 156/272; 274/41 A; 274/41.6 S; 274/42 R; 427/54; 427/304; 427/314; 428/164; 428/409; 428/913

[58] Field of Search .............. 274/41.6 S, 41 A, 42 R; 428/156, 163, 164, 409, 913; 427/304, 314, 367, 54; 156/272, 209

[56] References Cited

U.S. PATENT DOCUMENTS

| 3,531,317 | 9/1970 | Patheiger et al. | 427/54 |
|---|---|---|---|
| 3,655,441 | 4/1972 | Kefalas | 428/163 |
| 3,740,286 | 6/1973 | Ban | 274/41 A |
| 3,745,055 | 7/1973 | Gorman | 156/209 X |
| 3,800,099 | 3/1974 | Dickopp et al. | 274/41 A |
| 3,842,194 | 10/1974 | Clemens | 274/41 A |
| 3,971,874 | 7/1976 | Ohta et al. | 428/913 X |
| 3,977,684 | 8/1976 | Camerik | 274/41.6 S |
| 4,023,185 | 5/1977 | Bloom et al. | 428/913 X |
| 4,039,764 | 8/1977 | Bricot et al. | 274/42 R |
| 4,041,530 | 8/1977 | Kramer et al. | 274/42 R |

Primary Examiner—Harold Ansher
Attorney, Agent, or Firm—Hill, Gross, Simpson, Van Santen, Steadman, Chiara & Simpson

[57] ABSTRACT

A disc-shaped information carrier for high-density storage, in particular for video signals, has the information provided on both sides of the carrier and stored in the form of a beam-reflecting surface structure which is covered by a layer of translucent material. A disc-shaped base element is formed by injection molding, pressing, stamping or the like to exhibit a surface structure corresponding to the information to be stored on both sides thereof. Each side has a thin metallic coating applied thereto which maintains the same surface profile and the information structure is protected on each side with a layer of transparent material.

12 Claims, 4 Drawing Figures

Fig. 3

```
FORM THERMOPLASTIC DISC WITH A SURFACE PROFILE
ON EACH SIDE CORRESPONDING TO THE INFORMATION TO
BE STORED (BY STAMPING, PRESSING, INJECTION MOLDING, ETC.)
            │
            ▼
APPLY BEAM-REFLECTING METALLIC COATING 300-1000 Å
THICK OVER EACH SURFACE PROFILE & MAINTAINING
THE SURFACE PROFILES
            │
            ▼
APPLY TRANSPARENT LACQUER COATING 200-400μ OVER
EACH METALLIC COATING
```

Fig. 4

```
APPLY LACQUER COATING TO EACH SIDE OF A CENTRAL
BASE PLATE
    TRANSPARENT              OPAQUE
    BASE                     BASE
    PLATE                    PLATE
            │
            ▼
EMBOSS LACQUER COATINGS WITH SURFACE PROFILES
CORRESPONDING TO THE INFORMATION TO BE STORED
            │
            ▼
IRRADIATING THE EMBOSSED LACQUER COATINGS WITH
UV TO SET INFORMATION
    THROUGH                  FROM
    TRANSPARENT              BOTH
    BASE PLATE               SIDES
            │
            ▼
APPLY BEAM-REFLECTING METALLIC COATING 300-1000 Å
THICK OVER EACH SURFACE PROFILE & MAINTAINING THE
SURFACE PROFILES
            │
            ▼
APPLY TRANSPARENT LACQUER COATING 200-400μ OVER
EACH METALLIC COATING
```

DISC-SHAPED INFORMATION CARRIER HAVING INFORMATION IN THE FORM OF A BEAM-REFLECTING STRUCTURE AND A PROCESS FOR PRODUCING THE SAME

BACKGROUND OF THE INVENTION

1. Field of the Invention

The present invention relates to an information carrier for high-density storage, in particular for the storage of video signals, in which the information is provided on both sides of the carrier and stored in the form of a beam-reflecting surface structure which is covered, in each case, by a layer of translucent material.

2. Description of the Prior Art

An information carrier of the type mentioned above is known in the art, for example reference may be taken to the German published application No. 2,341,338, which corresponds to the British Pat. No. 1,446,009 of Aug. 11, 1976 and the Australian Pat. No. 5,974,573 of Mar. 6, 1975. This prior information carrier comprises two separate discs of transparent material which are connected together by an intermediate layer and having their respective sides provided with a beam-reflecting surface structure each of which faces the other. With this structure, the information is read by an optical scanning beam which penetrates from the outside through the transparent carrier layer to the beam reflecting surface, where the beam is reflected and modulated according to the profile of the beam-reflecting surface. Here, the thickness of the transparent carrier layer is not particularly critical because the scanning beam is focused as precisely as possible in the information plane. However, considerable demands are made on the homogeneity of the transparent carrier material and in this respect certain difficulties arise in the production of such information carriers because material residues, called "tags", stick to the pressing die and cause corresponding fault zones in the information carriers which are made from these dies. Other material discrepancies are caused by internal material stresses, bubbling or other harmful phenomena which arise during the production process.

SUMMARY OF THE INVENTION

It is the primary object of the present invention to provide an information carrier for signals that can be read optically and in which the aforementioned discrepancies or fault zones do not have an adverse effect on the reading process.

Starting with a disc-shaped information carrier of the general type mentioned above, the above objective is achieved, according to the present invention, by providing a disc-shaped base element which is made of opaque material, for example, and which exhibits a surface structure corresponding to the information contained therein on both sides by providing the two sides of the base element with a thin metallic coating which preserves the surface structure. Finally, the metallic coatings are covered with a layer of translucent material.

In one embodiment of the invention, the base element may be a thermosetting layer having the surface profile information storage structure on each side thereof.

In another embodiment of the invention, the base element may comprise an unprofiled disc which is provided with a lacquer coating on each side, the lacquer coating being embossed with the stored information and hardened by the application of radiant energy thereto, such as by ultraviolet light.

The unprofiled disc may be a transparent material, in which case the lacquer layers may be irradiated from one side, with the distant lacquer layer receiving the radiant energy via the other lacquer layer and the intermediate transparent layer. With an opaque central layer, such as aluminum, the lacquer layers must be irradiated from respective sides.

BRIEF DESCRIPTION OF THE DRAWINGS

Other objects, features and advantages of the invention, its organization, construction and operation will be best understood from the following detailed description taken in conjunction with the accompanying drawings, on which:

FIG. 3 is a flow chart which describes the process for producing an information carrier of the type illustrated in FIG. 1; and FIG. 4 is a flow chart for a process for producing an information carrier of the type illustrated in FIG. 2.

DESCRIPTION OF THE PREFERRED EMBODIMENTS

Figure 1:
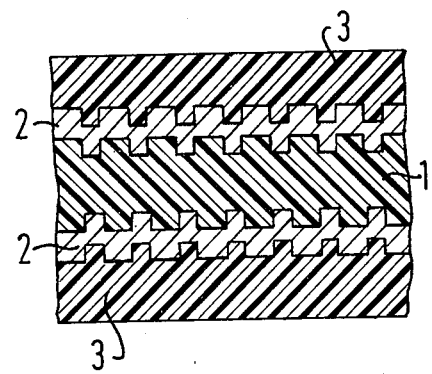
FIG. 1 is a greatly magnified sectional view of a portion of an information carrier constructed in accordance with the present invention.

Referring to FIGS. 1 and 3, an information carrier and a process for producing the same are illustrated. The information carrier essentially comprises a disc-shaped base element 1 constructed of an opaque material. On each side of the base element 1, there is a surface structure corresponding to the information stored, the surface structure being a profile which is produced by stamping, pressing, injection molding or other suitable techniques. A beam-reflecting metallic coating 2 of roughly 300 to 1000 Å thickness is provided over each surface profile of the base element 1 by vapor deposition or chemical processes. It will be appreciated that the metallic coating reproduces and maintains the surface profile and therefore the stored information. Finally, a transparent lacquer coating 3 of about 200 to 400 μ thickness is applied over each of the metallic coatings 2 in order to protect the informatiom against scratches, dust and the like. The lacquer coatings 3 form the entry and exit faces for the optical scanning beam. In comparison with the carrier molded under the influence of pressure and heat as known in the prior art, these lacquer coatings offer considerable advantages with regard to their optical properties because the chance of potential fault zones, caused by internal material stresses, bubbling or other harmful phenomena, are substantially reduced. Advantageously, the thickness of the lacquer coatings 3 is selected such that dust particles, scratches, etc, on the surface of the lacquer are so far outside the depth of focus of the optical reproduction system that such surface faults are no longer a nuisance. The total thickness of the information carrier is about 1 to 1.5 mm.

Figure 2:
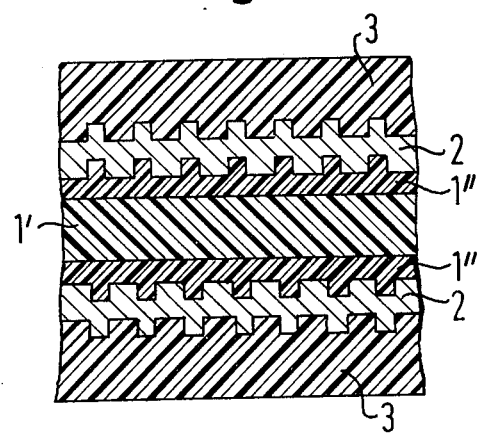
FIG. 2 is also a greatly magnified sectional view of a portion of another information carrier constructed in accordance with the present invention.

Referring now to FIGS. 2 and 4, another embodiment of the information carrier and its process of production are illustrated. With respect to structure, only the base element differs from the base element illustrated in FIG. 1. In FIG. 2, the basic material for the base element is an unprofiled disc-shaped base plate 1' which is provided on both sides with an information layer 1'' reproducing the information structure. The reproduction of the information structure is carried out with the aid of an embossing die, for example. The information layers 1'' are preferably constituted by lacquer coatings that can be set by the action of radiant energy, for example UV light. Expediently, a transparent base plate 1' is used with this production method because the radiation source can then act on both information layers simultaneously. In the alternative, however, an opaque base plate, made of aluminum for example, can also be used. In this case, the hardening process using ultraviolet light or other radiation is carried out, not through the base plate, but from both sides using a glass matrix in each case. After irradiation to harden the lacquer coatings and set the information, the element is processed in a manner similar to the device in FIG. 1 in that beam-reflecting metallic coatings 2 are applied over the information layers 1'' reproducing and maintaining the same surface profiles, and the metallic coatings are then covered with transparent lacquer coatings 3.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. An information carrier for high-density storage, comprising:
    a base element including a pair of surfaces each having a surface profile structure corresponding to the stored information;
    a pair of metallic beam reflecting layers each carried on a respective one of said surfaces and having the respective surface profile on the outer metal surfaces; and
    a pair of transparent layers each carried on a respective one of said metallic layers 2. The information carrier of claim 1, wherein said base element comprises a thermosetting material.

3. The information carrier of claim 1, wherein said base element comprises:
    a central layer having a pair of planar surfaces; and
    a pair of information bearing layers each carried on a respective one of said planar surfaces and each having a respective one of said surface profile structures.

4. The information carrier of claim 3, wherein said central layer comprises opague material.

5. The information carrier of claim 3, wherein said central layer comprises an aluminum layer.

6. The information carrier of claim 1, wherein:
    each of said metallic layers has a thickness in the range of 300 to 1000 Å; and
    each of said transparent layers has a thickness in the range of 200 to 400 $\mu$.

7. The information carrier of claim 1, wherein said carrier is disc-shaped.

8. A process for producing an information carrier comprising the steps of:
    forming a surface structure on each side of a base element corresponding to information to be stored;
    applying a metallic coating on each of the sides while maintaining
    the same surface structure on the outer metal surfaces; and applying a transparent coating over each of the metallic coatings.

9. The process of claim 8, wherein the step of applying the metallic coatings is further defined as vapor depositing the metal coatings on the base element.

10. The process of claim 8, wherein the step of applying the transparent coatings is further defined as covering the metallic coatings with lacquer.

11. A process for producing an information carrier, comprising the steps of:
    forming surface profiles on opposite surface portions of a base element to define the information to be stored;
    hardening the profiled surface portions;
    applying a beam-reflecting profiled metallic layer on each of the surface profiles on the outer metal surfaces while maintaining the same profiles; and
    applying transparent protective coatings over the metallic layers.

12. The process of claim 11, wherein the step of hardening is further defined as:
    heating the profiled surface portions.

* * * * *